/

US006946651B1

(12) United States Patent
Bohne

(10) Patent No.: US 6,946,651 B1
(45) Date of Patent: Sep. 20, 2005

(54) METHOD AND APPARATUS FOR WATER PURIFICATION

(75) Inventor: Mark F. Bohne, 311 E. Mason Rd., Milan, OH (US) 44846

(73) Assignee: Mark F. Bohne, Milan, OH (US)

( * ) Notice: Subject to any disclaimer, the term of this patent is extended or adjusted under 35 U.S.C. 154(b) by 62 days.

(21) Appl. No.: 10/412,142

(22) Filed: Apr. 11, 2003

Related U.S. Application Data
(60) Provisional application No. 60/372,955, filed on Apr. 16, 2002.

(51) Int. Cl.[7] .................................................. C02F 1/32
(52) U.S. Cl. ..................... 250/236; 250/235; 250/238
(58) Field of Search ................................. 250/435, 436, 250/432 R

(56) References Cited

U.S. PATENT DOCUMENTS

| | | | | |
|---|---|---|---|---|
| 4,956,754 A | * | 9/1990 | Chen | 362/101 |
| 5,474,748 A | * | 12/1995 | Szabo | 422/186.04 |
| 5,597,487 A | | 1/1997 | Vogel et al. | |
| 5,675,153 A | * | 10/1997 | Snowball | 250/438 |
| 5,874,741 A | * | 2/1999 | Matschke | 250/435 |
| 5,994,146 A | * | 11/1999 | Wright et al. | 436/146 |
| 6,120,691 A | * | 9/2000 | Mancil | 210/748 |
| 6,332,981 B1 | | 12/2001 | Loyd | |
| 6,610,258 B1 | * | 8/2003 | Strobbel et al. | 422/186.3 |
| 2002/0162968 A1 | * | 11/2002 | Snowball | 250/432 R |

\* cited by examiner

*Primary Examiner*—Nikita Wells
*Assistant Examiner*—Johnnie L Smith, II
(74) *Attorney, Agent, or Firm*—MacMillan, Sobanski & Todd, LLC

(57) ABSTRACT

An apparatus for disinfecting a fluid includes a tube connected with a source of the fluid. The tube allows the fluid to be transported from the source to a discharge. An ultraviolet lamp is positioned adjacent the tube, and is adapted to transmit light waves through the fluid. The tube can be a coiled tube having one or more coils thereby forming a helical tube. Each coil of the helical tube has an inner diameter and an outer diameter. The inner diameters of the coils define a space or opening. The ultraviolet lamp is positioned within the opening. A fluid passing through the coils of the tube are exposed to the ultraviolet light. The method of the invention includes moving water from a source to a discharge, through the tube while the lamp is activated. Water will become disinfected as it is exposed to the ultraviolet light of the lamp.

17 Claims, 3 Drawing Sheets

METHOD AND APPARATUS FOR WATER PURIFICATION

CROSS REFERENCE TO RELATED APPLICATIONS

This application claims the benefit of U.S. Provisional Application No. 60/372,955 filed Apr. 16, 2002, the disclosure of which is incorporated herein by reference.

BACKGROUND OF THE INVENTION

This invention relates to water purification systems. More particularly, this invention relates to water purification systems incorporating a method for the exposure of water to ultraviolet light.

It is known to use ultraviolet (UV) radiation to disinfect drinking water. It is also known that ultraviolet radiation is a means for meeting the bacteriological requirements of the drinking water standards as enumerated in the Safe Drinking Water Act (SDWA), 42 U.S.C. §300(f) et seq. (1974). Studies have indicated that ultraviolet radiation at a level of 2,537 Angstrom units applied at a minimum dosage of 16,000 micro-watt-seconds per square centimeter at all points throughout a water disinfecting chamber is adequate to purify water for drinking. It is generally known to use 30,000 micro-watt seconds per square centimeter to obtain the desired effect. Using a higher standard helps account for any losses that may occur in the exposure chamber. If a UV lamp is used that maintains 80% power over 9,000 hours (approximately one year), then setting a standard of 38,000 micro-watt-seconds per square centimeter would insure that the lamp would require replacement no more than yearly, while adequately sterilizing the water flow that is exposed to the UV lamp.

In commonly configured ultraviolet light water purification systems, ultraviolet light serves the purpose of exposing a fluid to ultraviolet light radiation which either kills bacteria or renders bacteria unable to reproduce. A straight quartz fluid tube permits an ultraviolet light source to be inserted in the inside diameter of the tubing while water is passed over the outside diameter of the length of the lamp.

One commonly known means of exposing water to ultraviolet light is to place a light source in a straight quartz tube with water flowing through an outer chamber past the linear distance of the ultraviolet light source. Such a design generally requires a pressure cylinder to be built around the lamp-supporting construction. This also requires that the pressurized cylinder be at the same length or longer than the provided ultraviolet light source. It would, therefore, be advantageous to develop an apparatus that can more easily be used to purify water.

SUMMARY OF THE INVENTION

The invention relates to an apparatus for disinfecting a fluid. The apparatus includes a tube connected to a source of fluid. The tube allows the fluid to be transported from the source to a discharge. An ultraviolet lamp is positioned adjacent the tube, and is adapted to transmit light waves through the fluid. The tube can be a coiled tube having one or more coils thereby forming a helical tube. Each coil of the helical tube has an inner diameter and an outer diameter. The inner diameters of the coils define a space or opening. The ultraviolet lamp can be positioned within the opening. A fluid passing through the coils of the tube are exposed to the ultraviolet light. The tube can be made of germicidal glass or quartz.

The method of the invention includes moving water from a source to a discharge, through the tube while the lamp is activated. Water will become disinfected as it is exposed to the ultraviolet light of the lamp. Due to the shape of the tube, more water can be exposed to the ultraviolet light in a shorter distance than with linear tubes.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
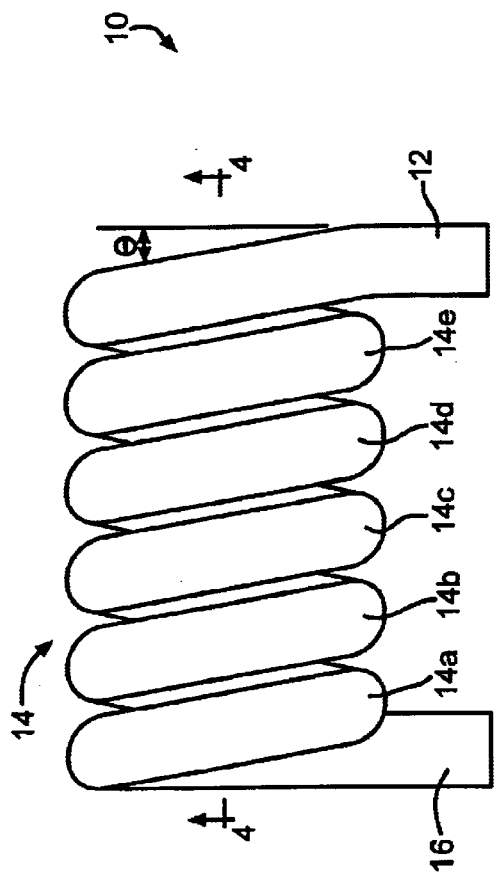
FIG. 1 is a side elevational view of a helical tube in accordance with the present invention.
Figure 2:
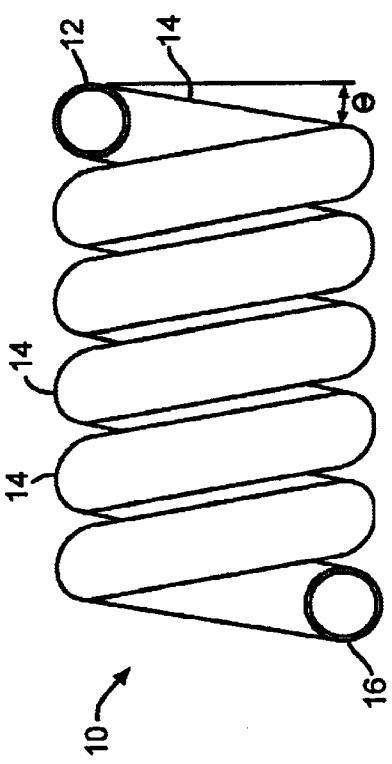
FIG. 2 is a plan view of the helical tube shown in FIG. 1.

Referring now to the drawings, there is illustrated in FIG. 1 a side elevational view of a helical tube indicated generally at 10. The generally transparent tube 10 is adapted to allow a fluid, such as water, to pass through the inner surface of the tube 10. Particularly, a fluid can enter from a source connecting tube 12, pass through the coils of the helix (helical coils) generally shown at 14, and exit from a discharge connecting tube 16. Each coil 14a, 14b, 14c, 14d, and 14e is generally hollow and interconnects to each adjacent coil. The coils on each end of the tube 10 are also connected to a source 12 and discharge 16 tube. The source connecting tube 12 and discharge connecting tube 16 can have any shape, such as the hollow, generally cylindrical shape shown in the Figures. The tubes 12 and 16 are preferably shaped so that the helical tube 10 can be connected to a source of fluid (not shown) and a discharge receptacle or an outlet pipe (not shown). The helical coils 14 are shown having an angled pitch, θ. However it is understood that the helix pitch angle, θ, can be larger or smaller as desired. Also, the helical coils 14 can be wound in the opposite direction. Additionally, as best seen in FIG. 2, the cross-sectional shape of the connecting tubes 12 and 16 is generally circular. Preferably the connecting tubes 12 and 16 are adapted to fit onto generally conventional piping. However, it should be understood that the cross-sectional shape of the connecting tubes 12 and 16 can have any desired shape such as generally oval or rectangular.

Figure 3:
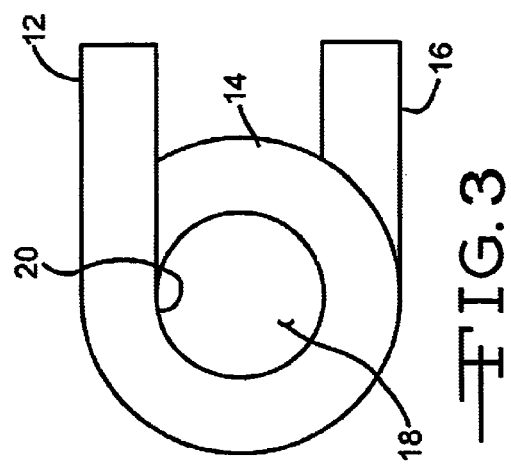
FIG. 3 is an end view of the helical tube shown in FIGS. 1 and 2.

Illustrated in FIG. 3 is an end view of the helical tube 10 of the present invention. The helical coils 14 are shown as having a generally circular shape. Thus, each coil 14a, 14b, 14c, 14d, and 14e, each have an outer diameter and inner diameter. It should be understood, however, that the helical coils 14 can also have any desired cross-sectional shape. FIG. 3 illustrates an opening 18 defined by the inner diameters 20 of the helical coils 14 of the tube 10. The opening 18 is illustrated as having a generally cylindrical shape, however, it should be understood that the opening 18 can have any shape or size, and have a non-uniform diameter. For example, the opening could be cylindrical with the coils 14 having a larger diameter at a first end and a relatively smaller diameter at a second end. For example, the inner diameter of coil 14a is larger than 14b. Coil 14b has an inner diameter larger than coil 14c, and so forth. Thus, the shape of the opening 18 could be generally conical. Also, although only six helical coils 14 are illustrated, it can be appreciated that any desired number of helical coils 14 can be used in the tube 10 as required with the invention. Generally, with a greater number of helical coils 14, the overall length of the tube 10 could increase. However, a greater number of coils 14 could be formed in a similar or smaller area. This could be done by using smaller diameter coils, or using a smaller helix pitch angle, $\theta$. Additionally, the spacing between coils 14 could be increased or decreased as desired to incorporate a greater or fewer number of coils 14 into the helical tube 10.

Using a helical tube 10 reduces the linear flow requirements of a conventional straight tube fluid purification system. Fluid flow through a helical tube 10 allows there to be greater exposure of the fluid being carried within the tube 10 to a lamp 22 that is an ultraviolet light source over a shorter span length. Flow of a fluid through the helical tube 10 reduces the physical size of the purification unit versus a linear system since more flow can occur over the same linear distance. Additionally, since the helical tube 10 reduces the linear flow requirements when compared with straight tube systems, lower wattage lamps may be used. A shorter linear travel distance for a fluid with a helical tube 10 allows for the same micro-watts-seconds exposure of the fluid within a reduced space.

It is preferred that the helical tube 10 be formed from quartz or glass. It is further preferred that the type of glass used is of a germicidal type. Glass is typically a poor conductor of ultraviolet light but germicidal glass has improved conductive qualities. Quartz or glass tubing can also permit the flow of heated fluids through the tube 10 with a reduced possibility of malformation or deformation and, therefore, failure of the tube 10. Another benefit of using helical quartz or glass tubing is that helical quartz or glass tubing can withstand the pressure requirements of a water purification system. This reduces space and costs because no outer pressure chamber is required to maintain a relatively higher system pressure. Also, it is know that quartz has a negligible expansion rate under the typical conditions of operating the present invention. Therefore, quartz is a preferred material from which the tube 10 and preferably at least the helical coils 14 can be made. It can be appreciated, however, that any suitable material can be used in accordance with the invention as described herein. The thickness of the quartz helical coils can vary according to the desired design specifications. The thickness of the quartz wall will typically not affect the disinfection process. The invention design also allows multiple ultraviolet lamps 22 to be inserted into the opening 18 of the helix thereby increasing the available ultraviolet wattage within the same physical structure of the entire water purification assembly, as is described in greater detail below.

Figure 4:
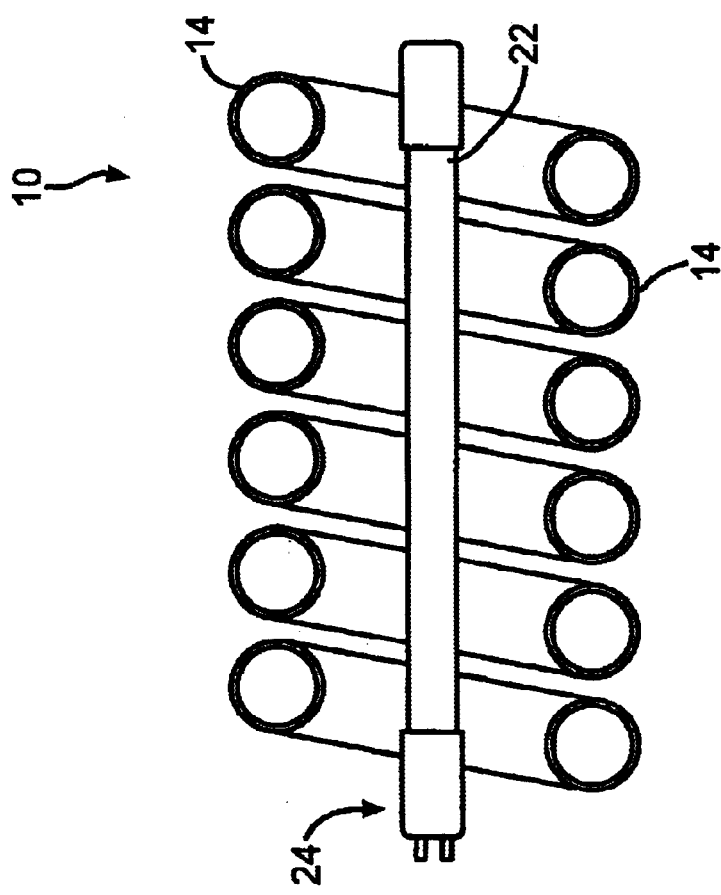
FIG. 4 is a sectional view of the helical tube through section line 4—4 with a lamp positioned within the helical tube.

Illustrated in FIG. 4 is a cross-sectional view of the helical tube 10 illustrated in FIG. 1. Again, it is shown that the preferred cross-sectional shape of the helical coils 14 is generally circular. However, the helical coils 14 can have any shape or size, as described above. Also shown in FIG. 4 is a lamp 22 positioned within the opening 18 of the helical tube 10. The lamp 22 is preferably an ultraviolet light, however, the lamp can be any type of lighting device that emits any type of radiation that can be used for the disinfecting of fluids. It is preferred that germicidal lamps be used since germicidal lamps have a sharply defined spectral output at 253.7 nanometers. Since this is very close to the wavelength most effective in inhibiting bacteria and molds, no wavelength correction is necessary. However, it can be appreciated that lamps can produce ultraviolet light having different wavelengths and be coated to adjust the wavelength for the optimal ultraviolet wavelength for inhibiting bacteria growth.

The lamp 22 preferably has electrical leads 24 that can are adapted to be connected to a source of electrical power (not shown). The source of electrical power, when activated, energizes the lamp 22 causing ultraviolet light to be emitted therefrom. In an alternate embodiment, the lamp 22 can have a power connection or electrical leads 24 at both ends, or at some other location along the length of the helical tube 10. Alternatively, a single-ended ultraviolet lamp (a lamp having electrical connections at only one end) could also be used.

Figure 5:
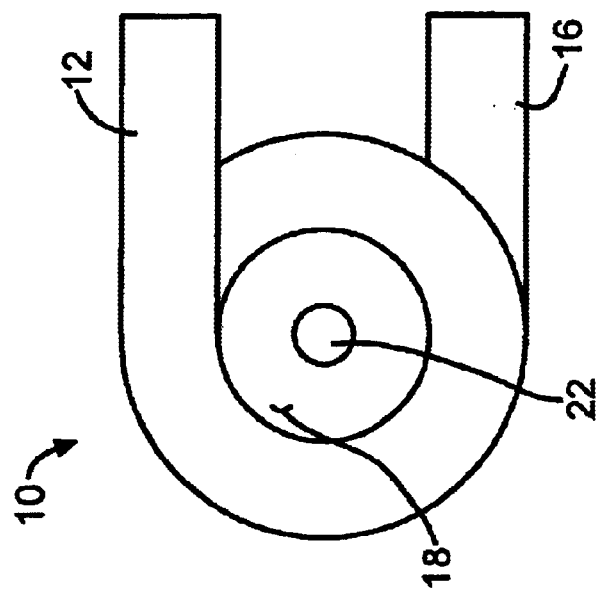
FIG. 5 is an end view of the helical tube shown in FIG. 4 with a lamp inserted within the helical tube.

Illustrated in FIG. 5 is an end view of the helical tube 10 with the lamp 22 positioned within the opening 18 of the tube 10. The lamp 22 is preferably centrally positioned within the opening 18 such that a generally equal amount of radiation is applied in all directions. However it is understood that the lamp 22 can be positioned off-center and still apply radiation to the helical coils 14. The lamp 22 illustrated is also shown as having a smaller diameter than that of the opening 18. It should be appreciated that the lamp 22 can have a larger or smaller diameter than illustrated. However, the diameter of the lamp 22 is preferably such that the lamp 22 can be positioned within the opening 18 of the helical tube 10. Alternatively, with a lamp 22 having a diameter that is smaller than the opening, a plurality of lamps 22 can be positioned within the opening 18 of the tube 10. If a plurality of lamps 22 are positioned within the opening 18, it is preferred that the lamps 22 be evenly spaced within the opening 18. However, the lamps 22 can be positioned closer or farther apart or randomly positioned within the opening 18.

Figure 6:
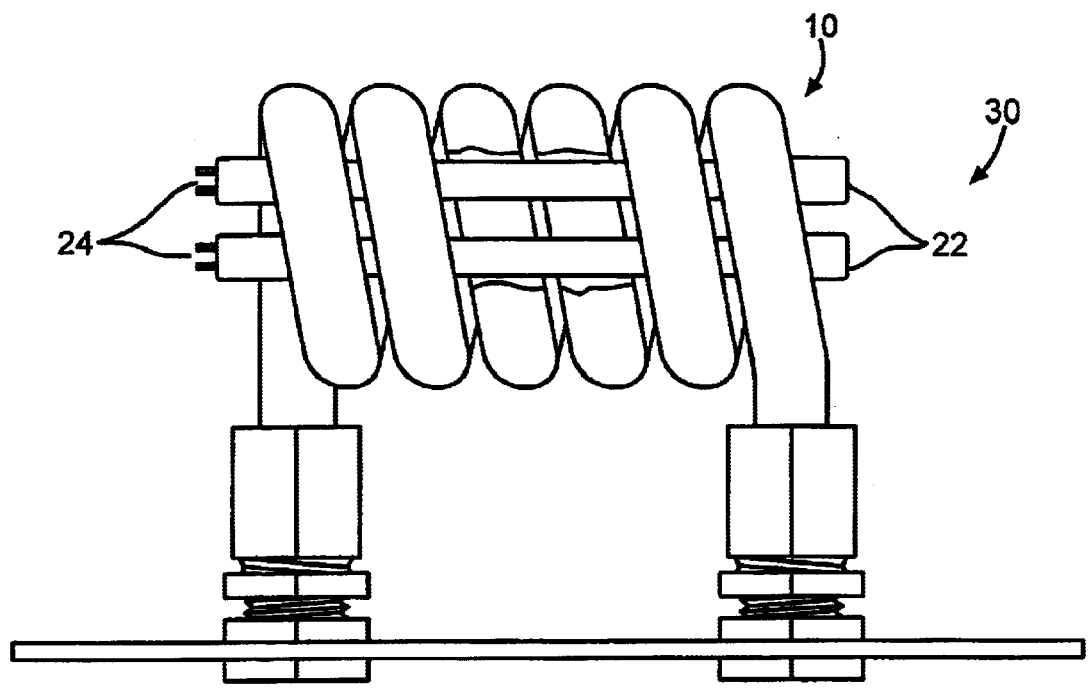
FIG. 6 is a side elevational view of a water purification apparatus with the helical tube of the present invention connected to inlet and outlet ports.

Now referring to FIG. 6, a water purification apparatus 30 including the helical tube 10 described above is illustrated. In commonly configured ultraviolet light water purification systems, ultraviolet light serves the purpose of exposing a fluid, preferably water, to ultraviolet light radiation which either kills bacteria or renders bacteria unable to reproduce. A straight quartz tube permits an ultraviolet light source to be inserted in the inside diameter of the tubing while water is passed over the outside diameter of the length of the lamp. Such flow is typically understood to be laminar flow. Laminar flow is classically defined as a well ordered pattern of flow whereby fluid layers are assumed to slide over one another. Utilizing tubing formed into a helical shape induces turbulence in the flow of the water. Turbulent flow is irregular or unstable flow. Because the flow is turbulent, more of the water is exposed to the ultraviolet light source. Additionally, more water is exposed to the light source without reducing the conductivity of the light waveforms.

Figure 7:
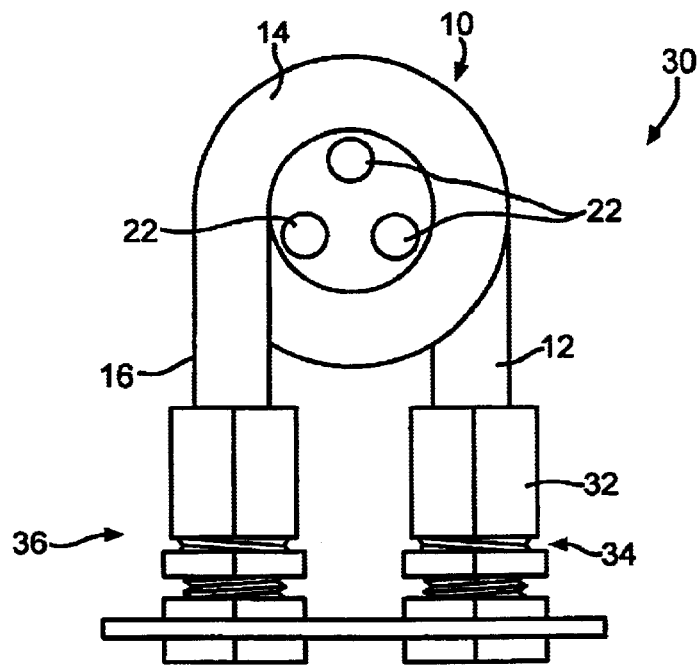
FIG. 7 is an end view of the water purification apparatus shown in FIG. 6.

The illustrated helical tube apparatus 30 has a plurality of ultraviolet lamps 22 positioned within the opening 18 of the tube 10. A portion of the helical coils 14 are shown with a section of the coils 14 removed so as to illustrate the general position of the lamps 22 within the opening 18. As best shown in FIG. 7, three lamps 22 are illustrated as being positioned within the opening 18. However, it should be understood that a greater or fewer number of lamps 22 can be used. Additionally, the positions of the lamps 22 can be different than those shown in the Figures. Each lamp 22 is positioned so that the electrical leads 24 are positioned on the same side of the opening 18 within the tube 10. However, the leads 24 can be positioned in any manner so that the leads 24 of the lamps 22 can be connected to a source of electricity.

Illustrated in FIG. 7 is the water purification apparatus 30 of the present invention. The source connecting tube 12 of the apparatus 30 is received within an adapter 34 so that a fluid source (not shown) can be connected to the helical tube 10. The adapter 34 can include conventional pipe threads at a second end and a compression ring and cap assembly 32 at a first end. The source connecting tube 12 can be received within the first end of the adapter 32. When the cap 32 is tightened, the compression ring (inside the cap 32) forms a seal with the source connecting tube 12. At the other end of the adapter 34, a conventional pipe, tube, or hose (not shown) can be connected by threading it onto the pipe threads. The discharge connecting tube 16 is similarly connected via an adapter 36 to a discharge chamber (not shown). It should be understood that the helical tube 10 can be adapted to connect to a source and discharge by any means. However, with the compression ring apparatus 34 and 36, it is preferred that the source connecting tube 12 and discharge connecting tube 16 are circular in cross-sectional shape. The discharged fluid can be collected from the chamber or transferred to another collection area. For example, the fluid can be piped for further processing, be bottled, or stored for any other use where purified water is desired.

Although a helical tube has been illustrated as the preferred embodiment, it can be appreciated that a transparent, linear tube could also be used without departing from the scope of the invention. Particularly, a light source could be positioned adjacent a tube that transports a fluid. Activation of the lamp while fluid is flowing through the pipe causes ultraviolet light to disinfect the fluid. In accordance with the present invention, wherein increased flow using the same or less amount of space and energy is desired, a plurality of transparent, linear tubes could be positioned adjacent the same lamp. Thus, a single lamp surrounded by a plurality of fluid tubes causes the fluid passing through each of the tubes to be acted upon by the light emitted. Alternatively, a lamp could be positioned adjacent a tube, wherein the tube is curved, but only extends in a single plane, similar to a radiator. When the fluid passes through the tube, the lamp acts on the fluid throughout the length of the tube. The lamp could be a "flat panel" lamp, or could be multiple linear lamps positioned in a row.

Although the illustrated water purification apparatus is horizontally oriented, it can be appreciated that the apparatus can also be mounted vertically, or at any desired angle, with the input and output ends adjusted accordingly. Additionally, although the invention has been described as using ultraviolet light to disinfect a fluid, it can be appreciated that any source of electromagnetic radiation could also be used in accordance with the invention.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for disinfecting a fluid delivered from a source comprising:

a tube connected with the source for transporting the fluid from the source to a discharge, said tube having a plurality of adjacent coils forming a helix; and an ultraviolet lamp positioned adjacent the tube, wherein the lamp is adapted to transmit light waves directly at the fluid within the tube such that the light is dispersed outwardly from the apparatus such that the light is not reflected back towards the apparatus except by the tube itself;

wherein the space between adjacent coils of the helix is less than the diameter of the helical tube, such that the helix substantially surrounds the ultraviolet lamp, thereby not requiring the apparatus to be disposed within a reflective chamber.

2. The apparatus defined in claim 1 wherein an inner surface of each coil defines an inner diameter, said inner diameters defining openings; and the ultraviolet lamp is positioned within the openings.

3. The apparatus defined in claim 2 wherein the opening of the helical tube has a first diameter;

the ultraviolet lamp has a second diameter; and the first diameter is larger than the second diameter.

4. The apparatus defined in claim 1 wherein each of the coils have an inner diameter defining an opening; and the ultraviolet lamp is positioned within the openings.

5. The apparatus defined in claim 4 wherein the ultraviolet lamp is centrally positioned within the opening.

6. The apparatus defined in claim 4 wherein a plurality of ultraviolet lamps are positioned within the opening.

7. The apparatus defined in claim 6 wherein the plurality of ultraviolet lamps are equally spaced about the opening.

8. The apparatus defined in claim 1 wherein the ultraviolet lamp is a germicidal lamp.

9. The apparatus defined in claim 1 wherein the lamp is linearly shaped.

10. The apparatus defined in claim 1 wherein the helical tube is a quartz tube.

11. The apparatus defined in claim 1 wherein the helical tube is a germicidal glass tube.

12. A method of disinfecting water comprising:

providing a source of water, providing a tube connected to the source of water, said tube being transparent to ultraviolet light and having a plurality of adjacent coils, said coils forming the tube;

providing an ultraviolet light source;

positioning the light source adjacent the tube;

activating the light source to generate high-intensity ultraviolet light waves that are directed at the tube such that the light is dispersed outwardly from the apparatus such that the light is not reflected back towards the apparatus;

supplying the fluid into the tube from the source of water; and collecting the disinfected water in a receptacle;

wherein the spacing between adjacent coils is less than the diameter of the tube such that the coils substantially surround the ultraviolet lamp thereby not requiring the apparatus to be disposed within a reflective chamber.

13. The method defined in claim 12 wherein each of the plurality of coils has an inner diameter defining an opening, said lamp being positioned within said opening.

14. The method defined in claim 12 wherein the light source is a plurality of ultraviolet lamps.

15. The method defined in claim 12 wherein the tube is a quartz tube.

16. The method defined in claim 12 wherein the tube is a germicidal glass tube.

17. An apparatus for disinfecting a fluid delivered from a source comprising:

a germicidal glass tube connected with the source for transporting the fluid from the source to a discharge; and an ultraviolet lamp positioned adjacent the tube, wherein the lamp is adapted to transmit light waves through the fluid such that the light waves are transmitted directly at the fluid within the tube such that the light is dispersed outwardly from the apparatus such that the light is not reflected back towards the apparatus except by the tube itself;

wherein the tube has a plurality of adjacent coils forming a helix; and the space between adjacent coils of the helix is less than the diameter of the helical tube thereby not requiring the apparatus to be disposed within a reflective chamber.

* * * * *